(12) United States Patent
Yeh et al.

(10) Patent No.: US 9,736,340 B2
(45) Date of Patent: Aug. 15, 2017

(54) DECODER AND DECODING METHOD FOR AUDIO VIDEO STREAM SYNCHRONIZATION

(71) Applicant: MStar Semiconductor, Inc., Hsinchu Hsien (TW)

(72) Inventors: Wen-Shen Yeh, Hsinchu County (TW); Kuo-Ho Tsai, Hsinchu County (TW); Hsiang-Wei Wu, Hsinchu County (TW); Sheng-Yuan Chen, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 322 days.

(21) Appl. No.: 14/587,544

(22) Filed: Dec. 31, 2014

(65) Prior Publication Data
US 2015/0195427 A1   Jul. 9, 2015

(30) Foreign Application Priority Data

Jan. 3, 2014   (TW) .............................. 103100252 A

(51) Int. Cl.
*H04N 7/12*       (2006.01)
*H04N 5/04*       (2006.01)
(Continued)

(52) U.S. Cl.
CPC .............. *H04N 5/04* (2013.01); *G11B 27/10* (2013.01); *H04N 9/89* (2013.01); *H04N 21/4305* (2013.01); *H04N 21/4307* (2013.01)

(58) Field of Classification Search
CPC .............. G11B 20/00007; G11B 27/10; G11B 2020/00014; G11B 2020/00072; H04N 21/4305; H04N 21/4307; H04N 9/89
See application file for complete search history.

(56) References Cited

U.S. PATENT DOCUMENTS

| | | | |
|---|---|---|---|
| 6,512,552 B1 * | 1/2003 | Subramanian | H04N 5/04 348/423.1 |
| 2002/0150126 A1 * | 10/2002 | Kovacevic | G11B 27/10 370/503 |

(Continued)

FOREIGN PATENT DOCUMENTS

CN        102075806        5/2011

OTHER PUBLICATIONS

State Intellectual Property Office of the People's Republic of China, "Office Action", dated Jun. 20, 2017.

*Primary Examiner* — Sath V Perungavoor
*Assistant Examiner* — Puneet Dhillon
(74) *Attorney, Agent, or Firm* — WPAT, PC

(57) ABSTRACT

A decoding method for audio video stream synchronization is provided. The audio video stream includes multiple clock references and multiple audio and video data packets. Each of the data packets corresponds to a presentation value. The decoding method includes: reconstructing a clock value according to a first clock reference; determining whether a difference between the clock value and a first presentation value in multiple presentation values is greater than a first range; when the difference between the clock value and the first presentation value is greater than the first range, changing the clock value to a second presentation value in the multiple presentation values; and performing at least one audio video synchronization step according to the clock value set based on the second presentation value.

18 Claims, 5 Drawing Sheets

(51) Int. Cl.
*H04N 9/89* (2006.01)
*H04N 21/43* (2011.01)
*G11B 27/10* (2006.01)

(56) References Cited

U.S. PATENT DOCUMENTS

| | | | |
|---|---|---|---|
| 2005/0018775 A1* | 1/2005 | Subramanian | H04N 21/44004 375/240.25 |
| 2006/0146886 A1* | 7/2006 | Hsu | H04J 3/0638 370/503 |
| 2013/0279888 A1* | 10/2013 | Zeng | H04N 9/87 386/357 |

* cited by examiner

DECODER AND DECODING METHOD FOR AUDIO VIDEO STREAM SYNCHRONIZATION

This application claims the benefit of Taiwan application Serial No. 103100252, filed Jan. 3, 2014, the subject matter of which is incorporated herein by reference.

BACKGROUND OF THE INVENTION

Field of the Invention

The invention relates in general to audio video playback, and more particularly, to audio and video synchronization in audio video playback.

Description of the Related Art

Watching videos is an essential part in modern life. For both work and entertainment purposes, people nowadays can play videos from optical disks, network video databases, smart electronic apparatuses and digital television channels. Modern industries have also defined many audio video compression and playback standards, e.g., Moving Picture Experts Group (MPEG), H.264 (or referred to as MPEG-4 Part 10, Advanced Video Coding (MPEG-4 AVC)), Audio Video Standard (AVS) and Video Codec-1 (VC-1).

An audio video synchronization (AV sync) mechanism is defined in video compression and playback involved in all of these industrial standards. However, at a player end, a playback task nevertheless needs to be completed when given a video with asynchronous audio and video. As a player end or a decoder end cannot guarantee that a compression end or an encoding end compresses a video entirely following an industrial standard, there is a need for an audio video synchronization mechanism at the player end, so as to correct asynchronous audio and video in the video as much as possible to provide better user experiences.

SUMMARY OF THE INVENTION

A method for audio video stream synchronization is provided according to an embodiment of the present invention. The audio video stream includes multiple clock references and multiple audio and video data packets. Each of the data packets corresponds to a presentation value. The decoding method includes: reconstructing a first clock value according to a first clock reference; determining whether a difference between the clock value and a first presentation value in multiple presentation values is greater than a first range; when the difference between the clock value and the first presentation value is greater than the first range, changing the clock value to a second presentation value in the multiple presentation values; and performing at least one audio video synchronization step according to the clock value set based on the second presentation value.

A decoder for audio video stream synchronization is provided according to another embodiment of the present invention. The audio video stream includes multiple clock references and multiple audio and video data packets. Each of the data packets corresponds to a presentation value. The decoder includes: a stream parsing module, configured to reconstruct a clock value according to a first clock reference; a management module, configured to determine whether a difference between the clock value and a first presentation value in multiple presentation values is greater than a first range, and to change the clock value to a second presentation value in the multiple presentation values when the difference between the clock value and the first presentation value is greater than the first range; and an audio video synchronization module, configured to perform at least one audio video synchronization step according to the clock value set based on the second presentation value.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
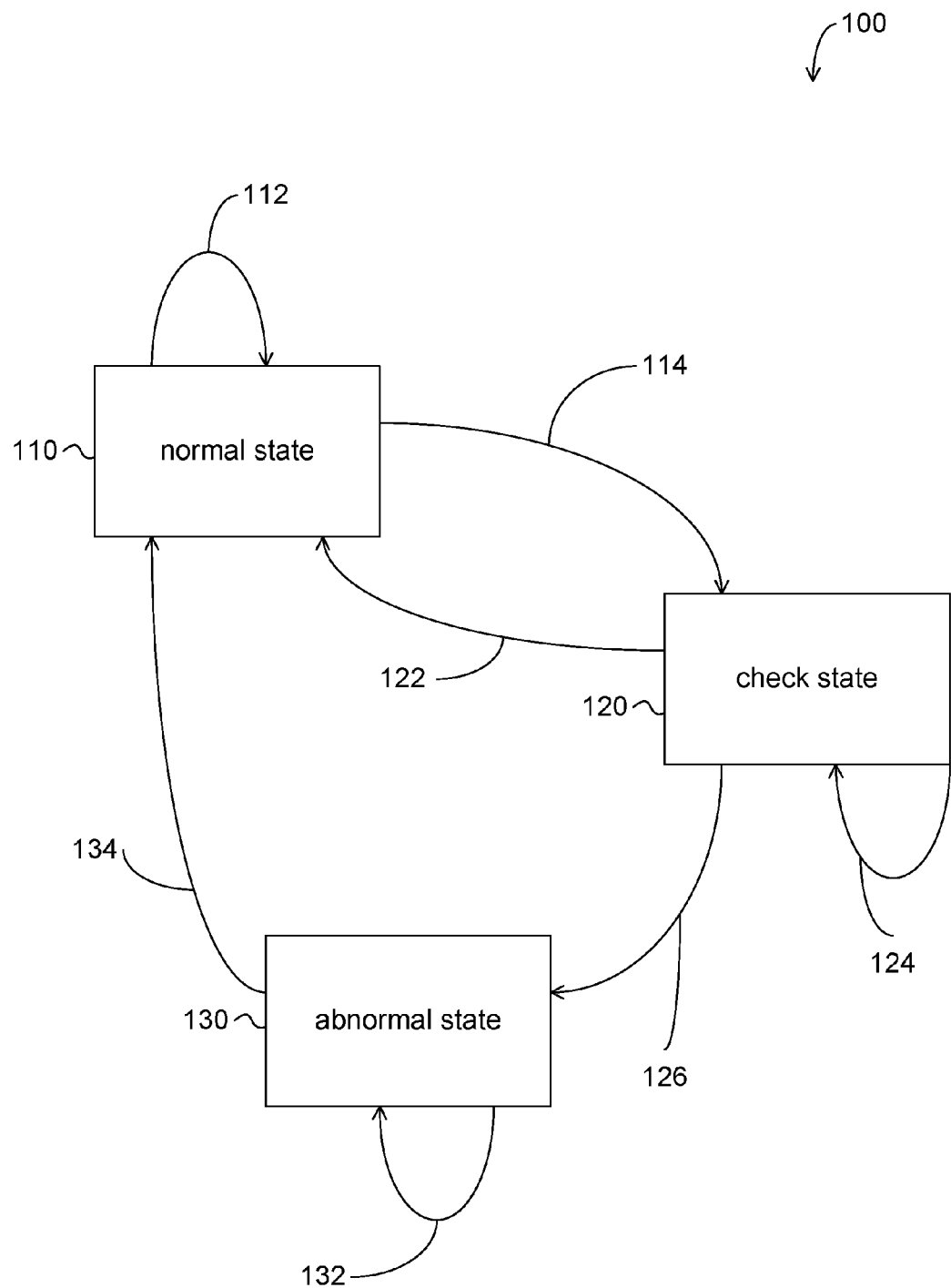
FIG. 1 is a schematic diagram of a state machine at a player end according to an embodiment of the present invention.

Embodiments of the present invention are described in detail below. Apart from the disclosed embodiments, the present invention is also applicable to other embodiments. The scope of the present invention is not limited by these non-limiting embodiments, and is defined in accordance with the appended claims. To better describe the contents of the present invention to one person skilled in the art and to keep the drawings clear, parts of the drawings are not drawn to actual sizes and ratios, and certain sizes and other associated scales may be emphasized to appear exaggerated, with unrelated details not entirely depicted.

In the description below, Moving Picture Experts Group (MPEG) is taken as an example. One person skilled in the art can understand that, apart from MPEG, other industrial standards may be applicable. The scope of the present invention is not limited to MPEG applications. How a video is compressed according to the MPEG standard is described briefly below, especially on the part concerning audio video synchronization.

Analog audio video signals are sampled, quantized and compressed to form an elementary stream (ES). Each elementary stream includes multiple access units (AUs), which may include video data or audio data. Each access unit includes data of one video frame or one audio frame.

A continuous elementary stream needs to be first segmented to form a packetized elementary stream (PES). When forming a packetized elementary stream, a presentation time stamp (PTS) and a decoder time stamp (DTS) may be added to a header of the packetized elementary stream. The presentation time stamp informs a player end when to present or play video data or audio data of a first access unit in the packetized elementary stream. In other words, the video data corresponds to one presentation time stamp, and the audio data also corresponds to one presentation time stamp. The decoder time stamp is for informing the player end when to perform decoding.

A compression end of the video then divides the packetized elementary stream into transport streams (TS) having a fixed length or program streams (PS) having a variable length. The header of the TS includes a program clock reference (PCR).

The compression end or the decoder end needs to have a system time clock (STC) having a frequency of 27 MHz. The system time clock is for instructing the above presentation time stamp and program clock reference. At a last moment before the program clock reference field is to be encoded, the decoder end is required to utilize an instantaneous sample value of the system time clock as the program clock reference and store the value to a program clock reference field.

At the decoder end, the system time clock that is synchronous with the encoder end is reconstructed according to the program clock reference. Each time a new program clock reference is received, the system time clock is reconstructed. Next, when parsing the header of the packetized elementary stream, the presentation time stamp of the video data and the presentation time stamp of the audio data as well as the associated decoder time stamp are retrieved. The presentation time stamps and the decoder time stamp are together forwarded and stored to a memory along with the parsed packetized elementary stream.

Before decoding each access unit of the elementary stream, the corresponding decoder time stamp and program clock reference are compared, and the decoding process begins when the two are equal. Before playing the video data or audio data of each access unit, the corresponding presentation time stamp and program clock reference are compared, and the playback process of the video data or audio data of the access unit begins when the two are equal.

The above scenarios describe ideal situations, i.e., the compression end or the encoder end is implemented strictly according to the industrial standard. When the encoder end does not compress a video according to such standard, an error in the program clock reference is frequently incurred. However, in such circumstances, the decoder end still needs to continue playing the video. One main spirit of the present invention is that, when the error of the program clock reference is within a predetermined range, the presentation time stamp is utilized to calibrate the system time clock that is reconstructed by the encoder, so that the audio data and video data may be synchronously played as much as possible. One other main spirit of the present invention is that, when the error of the program clock reference exceeds the predetermined range, the audio and video synchronization process is directly abandoned to reduce computing resources and efforts of the decoder.

FIG. 1 shows a schematic diagram of a state machine 100 of a player end according to an embodiment of the present invention. The player end is for playing an audio video stream including multiple audio and video data packets. Each of the audio and video data packets includes a presentation time stamp. The audio video stream further includes multiple program clock references. Each time when the player end receives one of the program clock references, a value of a system time clock is reconstructed. When the system time clock matches the presentation time stamp, the player end plays contents of the audio or video data packet to which the presentation time stamp belongs.

The state machine 100 has three states—a normal state 110, a check state 120 and an abnormal state 130. When a difference between the system time clock and the presentation time stamp is within a first range, i.e., when the program clock reference is a reasonable value, the normal state 110 maintains in the normal state 110 along a path 112. However, when the difference between the system time clock and the presentation time stamp exceeds the first range, i.e., when the program clock reference is an unreasonable value, the state 110 changes from the normal state 110 to the check state 120 along a path 114.

In one embodiment, the first range for the difference between the system time clock and the presentation time stamp may be a period, by which the system time clock is ahead of the presentation time stamp, that has not reached a first lower limit, or a period, by which the presentation time stamp is ahead of the system time clock, has not reached a second lower limit. In one example, the first lower limit equals the second lower limit. For example, both of the first lower limit and the second lower limit are 0.5 seconds. In another example, the first lower limit is greater than the second lower limit. For example, the first lower limit is 1 second, and the second lower limit is 0.7 second.

In the check state 120, when the difference between the program clock reference/system time clock and the presentation time stamp returns to within the first range, the state machine 100 returns to the normal state 110 along a path 122. When the difference between the program clock reference/system time clock and the presentation time stamp continues exceeding the first range for a period of within a predetermined time limit (e.g., 10 seconds), the state machine 100 maintains in the check state 120 along a path 124. However, when the difference between the program clock reference/system time clock and the presentation time stamp continues exceeding the first range for a period that exceeds the time limit (e.g., 10 seconds), the state machine 100 changes to the abnormal state 130 along a path 126.

In the abnormal state 130, the player end sets the value of the system time clock according to the presentation time stamp of the audio data or the video data. In one embodiment, the presentation time stamp for setting the system time clock corresponds to audio data. Accordingly, the presentation time stamp of the audio data is immediately synchronized with the system time clock, whereas the video data may not be synchronized with the system time clock. Thus, the player end may need to refer to a relationship between the presentation time stamp of the video data and the system time clock, in a way that certain video data is repeatedly played or certain video data is skipped and not played.

In another embodiment, the presentation time stamp for setting the system time clock corresponds to video data. Accordingly, the presentation time stamp of the video data is immediately synchronized with the system time clock, whereas the audio data may not be synchronized with the system time clock. Thus, the player end may need to refer to a relationship between the presentation time stamp of the video data and the system time clock, in a way that certain audio data is repeatedly played or certain audio data is skipped and not played.

In the abnormal state 130, the player end may omit the program clock reference, and reconstruct the system time clock according to the new program clock reference instead. The system time clock is set according to only the presentation time stamp of the audio data or the video data.

When the system time clock is set according to the presentation time stamp of the audio data and a difference between the presentation time stamp of the video data and the new program clock reference is smaller than the first range, the state machine 100 returns to the normal state 110 from the abnormal state 130 along a path 134. When the difference between the presentation time stamp of the video data and the new program clock reference still exceeds the first range, the state machine 100 remains in the abnormal state 130 from the abnormal state 130 along a path 132.

Similarly, when the system time clock is set according to the presentation time stamp of the video data and the difference between the presentation time stamp of the audio data and the new program clock reference is smaller than the first range, the state machine 100 returns to the normal state 110 from the abnormal state 130 along the path 134. When the difference between the presentation time stamp of the audio data and the new program clock reference still exceeds the first range, the state machine 100 remains in the abnormal state 130 from the abnormal state 130 along the path 132.

Figure 2:
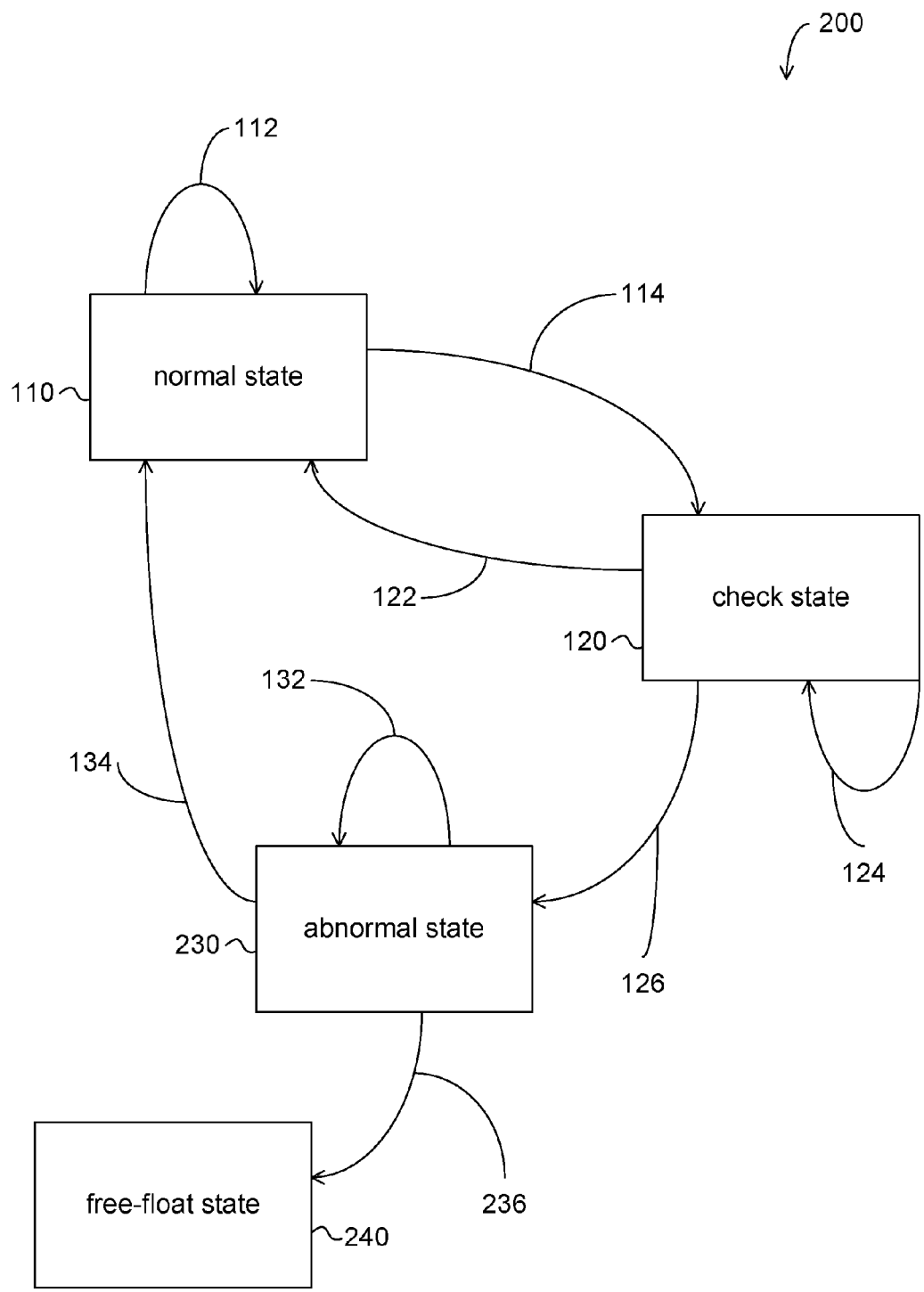
FIG. 2 is a schematic diagram of a state machine at a player end according to another embodiment of the present invention.

FIG. 2 shows a schematic diagram of a state machine 200 of a player end according to another embodiment of the present invention. A difference of the state machine 200 from the state machine 100 in FIG. 1 is a normal state 230 and a free-float state 240. States and paths with the same denotations may be referred from the description associated with FIG. 1, and shall be omitted herein.

In the abnormal state 230, the player end sets the value of the system clock reference according to the value from the presentation time stamp. When the system time clock is set according to the presentation time stamp of the audio data and a difference between the presentation time stamp of the video data and the new program reference clock is smaller than a first range, the state machine 200 returns to the normal state 110 from the abnormal state 230 along the path 134. When the difference between the presentation time stamp of the video data and the new program reference clock still exceeds the first range, the state machine 200 remains in the abnormal state 230 from the abnormal state 230 along the path 132. Further, when a difference between the presentation time stamp of the video data and the presentation time stamp of the audio data is greater than not only the first range but also a second range that is greater than the first range, the state machine 200 switches to the free-floating state 240 from the abnormal state 230 along a path 236.

Similarly, when the system time clock is set according to the presentation time stamp of the video data and a difference between the presentation time stamp of the audio data and the new program clock reference is smaller than the first range, the state machine 200 returns to the normal state 110 from the abnormal state 230 along the path 134. When the difference between the presentation time stamp of the audio data and the new program clock reference still exceeds the first range, the state machine 200 remains in the abnormal state 230 from the abnormal state 230 along the path 132. When the difference between the presentation time stamp of the audio data and the presentation time stamp of the video data is greater than not only the first range but also the second range that is greater than the first range, the state machine 200 switches to the free-floating state 240 from the abnormal state 230 along the path 236.

The first range and the second range may be symmetrical or asymmetrical. When the two are asymmetrical, an absolute value of the second range needs to be greater than an absolute value of the first range. For example, the first range of the system time clock may be ±0.5 second, and the second range may be ±0.8 second. In another embodiment, the first range of the system time clock may be within +0.5 second and −0.8 second, and the range of the second range may be within +0.7 second and −1 second; the range of the +0.7 second is greater than that of the +0.5 second, and the range of the −1 second is greater than that of the −0.8 second.

In the free-floating state 240, the program clock reference is incorrect, and the difference between the presentation time stamp of the audio data and the presentation time stamp of the video data is also greater than the second range. Therefore, in the present invention, it is determined that no resources need be wasted for video data and audio data synchronization under such circumstances. As such, the decoder does not perform operations of computing these values and audio video synchronization, leaving the playback of the video data and the playback of the audio data free-floating.

Figure 3:
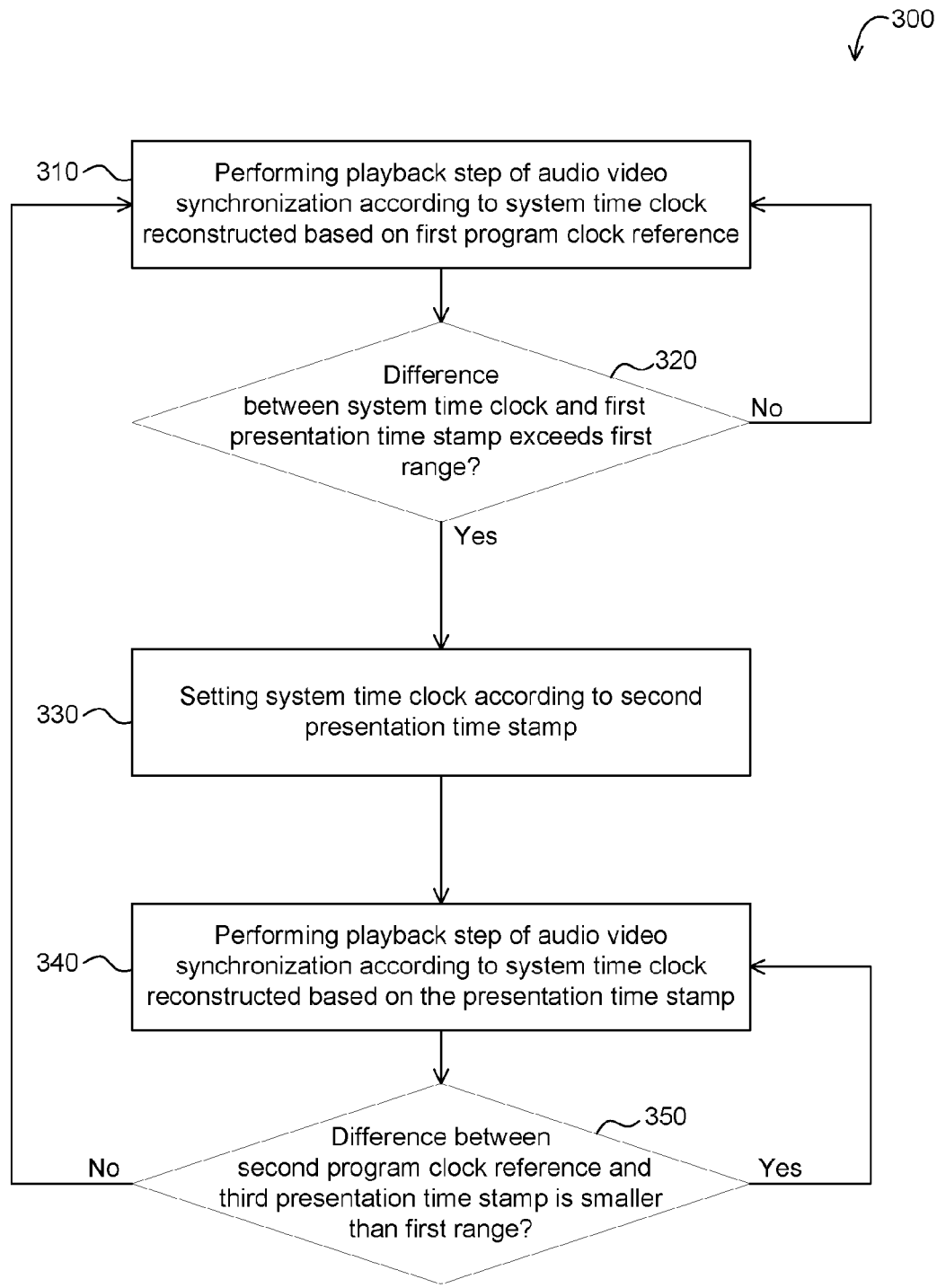
FIG. 3 is a schematic diagram of a process of a playback method according to an embodiment of the present invention.

FIG. 3 shows a flowchart of a process 300 of a playback method according to an embodiment of the present invention. The playback method is for playing an audio video stream including multiple audio and video data packets. Each of the audio and video data packets includes a presentation time stamp. The audio video stream further includes multiple program clock references. Each time when one of the program clock references is received, a value of a system time clock is reconstructed. When the system time clock matches with the presentation time stamp, contents of the audio or video data packet to which the presentation time stamp belong are played. The process 300 includes following steps.

In step 310, a playback step of audio video synchronization is performed according to the system time clock reconstructed based on a first program clock reference.

In step 320, it is determined whether a difference between the system time clock and a first presentation time stamp exceeds a first range. The process 300 returns to step 310 when the difference does not exceed the first range, or else proceeds to step 330 when the difference exceeds the first range.

In step 330, the system time clock is set according to a second presentation time stamp, followed by performing step 340. In one embodiment, the presentation time stamp for setting the system time clock is equal to the presentation time stamp used in step 320, i.e., the first presentation time stamp equals the second presentation time stamp. In another embodiment, the presentation time stamps in steps 320 and 330 are not the same presentation time stamp, i.e., the first presentation time stamp does not equal the second presentation time stamp.

In step 340, the playback step of audio video synchronization is performed according to the system time clock set based on the presentation time stamp, followed by performing step 350.

In step 350, it is determined whether a difference between a second program clock reference and a third presentation time stamp is smaller than a first range. The process 300 returns to step 310 when the difference is smaller than the first range, or else returns to step 340 when the difference is greater than the first range.

In step 330, the second presentation time stamp used for setting the system time clock may be associated with the video data or the audio data. When step 330 uses the presentation time stamp of the video data, the third presentation time stamp in step 350 is associated with the audio data. Conversely, when step 330 uses the second presentation time stamp of the audio data, the third presentation time stamp in step 350 is associated with the video data.

Figure 4:
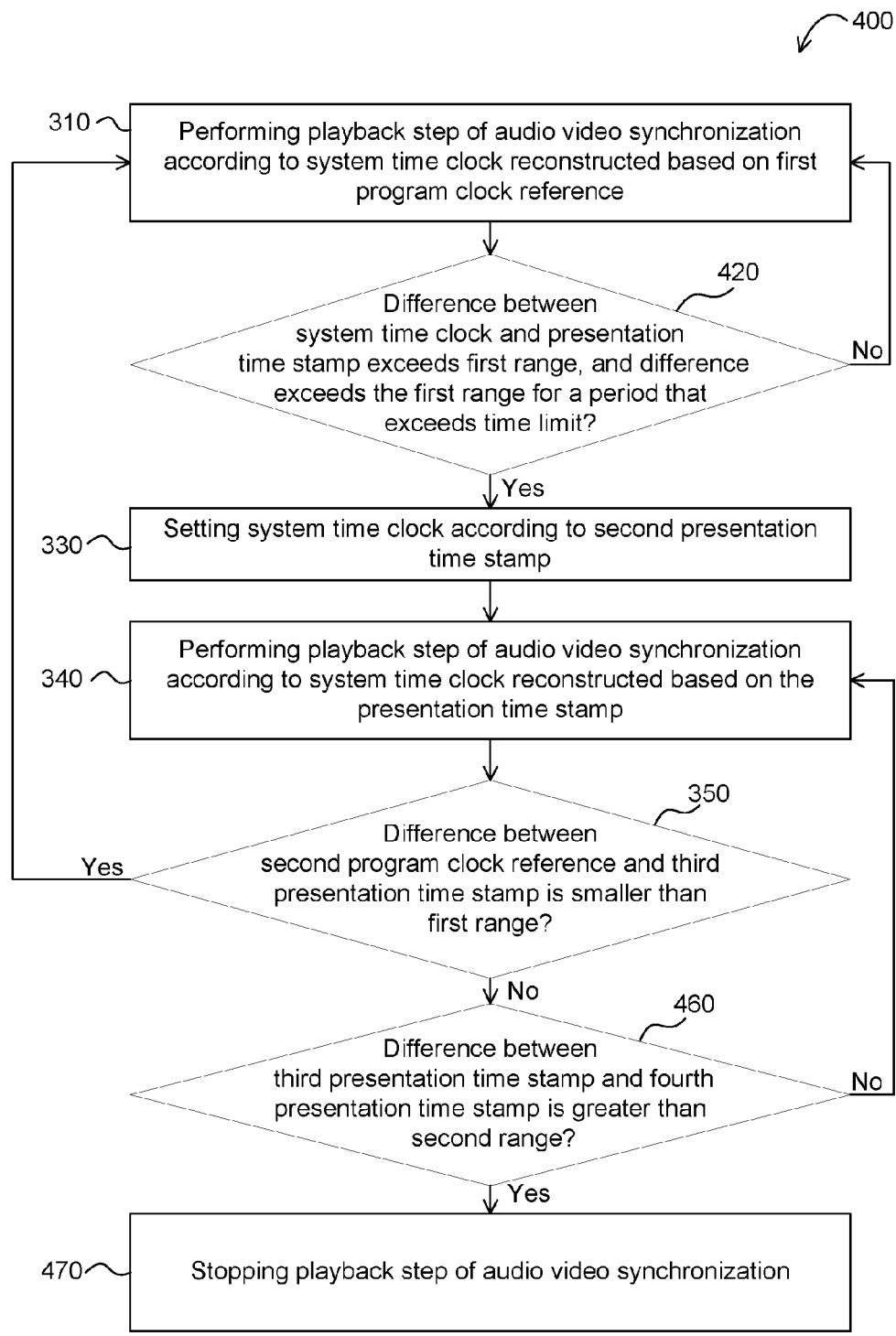
FIG. 4 is a schematic diagram of a process of a playback method according to another embodiment of the present invention.

FIG. 4 shows a flowchart of a process 400 of a playback method according to another embodiment of the present invention. Compared to the process 300 in FIG. 3, differences in the process 400 are reflected in steps below.

In step 420, it is determined whether a difference between the system time clock and the presentation time stamp exceeds the first range, and whether the difference exceeds the first range for a period that exceeds a time limit. The process 400 returns to 310 when the first range or the time limit is not exceeded, or else returns to step 330 when the first range and the time limit are exceeded.

In step 460, it is determined whether a difference between a third presentation time stamp and a fourth presentation time stamp is greater than a second range, wherein the second range is greater than or equal to the first range. The process 400 returns to step 340 when the difference is smaller than the second range, or else proceeds to step 470 when the difference is greater than the second range.

In step 470, the playback step for audio video synchronization is stopped.

Figure 5:
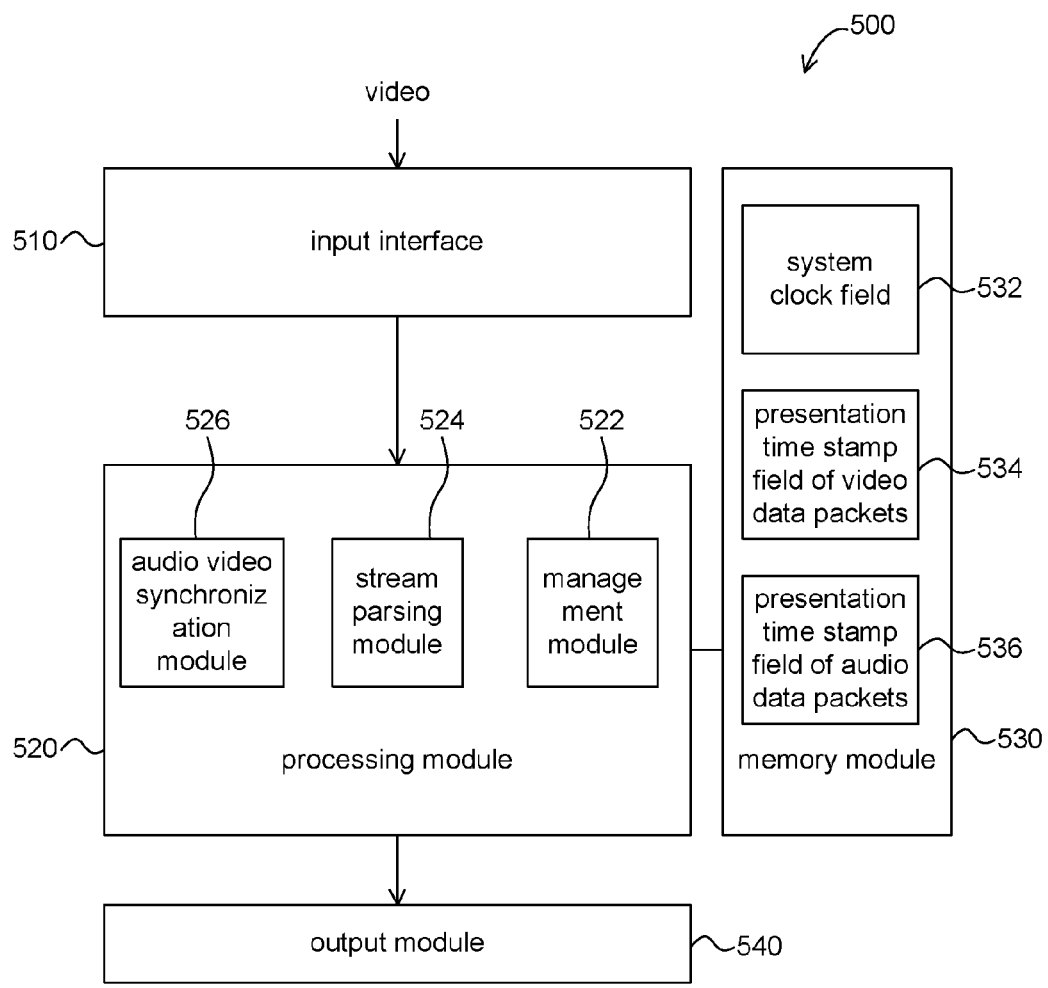
FIG. 5 is a block diagram of a video player according to an embodiment of the present invention.

FIG. 5 shows a block diagram of a video player according to an embodiment of the present invention. The video player 500 includes an input interface 510 for a video, a processing module 520, a memory module 530, and an output module 540 for audio and video signals. The input interface 510 forwards contents of the video to the processing module 520. The processing module 520 decodes and temporarily stores the received contents by the memory module 530, and outputs appropriate audio and video signals via the output module 540.

The processing module 520 may include a management module 522, a stream parsing module 524, and an audio video synchronization module 526. In one embodiment, the processing module 520 may include at least one processor, which executes an appropriate code for implementing functions of the three modules. In another embodiment, the processing module 520 may include three processors, which respectively execute appropriate codes for implementing functions of the three modules. One person skilled in the art can easily understand that, these functions may be implemented by software, hardware, or a combination of software and hardware. Methods for implementing these functions are limited by the present invention.

The stream parsing module 524 parses an audio video stream of a video, retrieves multiple clock references, and reconstructs a system time clock field 532 in the memory module 530. In addition, the stream parsing module 524 further parses multiple audio and video data packets of the video, retrieves presentation time stamps of the data packets, and stores the retrieved presentation time stamps to a presentation time stamp field 534 of the video data packets and a presentation time stamp field 536 of the audio data packets in the memory module 530.

The audio video synchronization module 526 performs a playback step of audio video synchronization according to the fields 532, 534 and 536 in the memory module 530. The management module 522 determines whether a difference between the system time clock and the presentation time stamp exceeds a first range. When the difference exceeds the first range, the management module 522 prompts the stream parsing module 524 to stop reconstructing the system time clock field 532 in the memory module 530, and to set the system time clock field 532 according to the presentation time stamp field 534 or 536.

In another embodiment, in addition to the determination of whether the difference exceeds the first range, the management module 522 further determines whether the difference exceeds the first range for a period that exceeds a time limit. When the difference exceeds the first range for a period that exceeds the time limit, the management module 522 prompts the stream parsing module 524 to stop reconstructing the system time clock field 532 in the memory module 530, and to set the system time clock field 532 according to the presentation time stamp field 534 or 536.

Next, the audio video synchronization module 526 performs the playback step of audio video synchronization according to the system time clock set based on the presentation time stamp. The management module 522 then determines whether a difference between the system time clock field 532 set based on the presentation time stamp and another presentation time stamp field 536 or 534 is smaller than the first range. When the difference is smaller than the first range, the management module 522 prompts the stream parsing module 524 to again reconstruct the system time clock field 532 in the memory module 530 according to the program clock reference. When the difference is still greater than the first range, the management module 522 keeps prompting the audio video synchronization module 526 to perform the playback step of audio video synchronization according to the system time clock set based on the presentation time stamp.

In another embodiment, when the difference is still greater than the first range, the management module 522 determines whether a difference between a presentation time stamp and another presentation time stamp respectively belonging to the audio data and the video data is greater than a second range, wherein the second range is greater than or equal to the first range. When the difference is smaller than the second range, the management module 522 keeps prompting the audio video synchronization module 526 to perform the playback step of audio video synchronization according to the system time clock set based on the presentation time stamp. When the difference is greater than the second range, the management module 522 prompts the audio video synchronization module 526 to stop performing the playback step of audio video synchronization.

One person skilled in the art can understand that, a main spirit of the present invention is that, when the error of the program clock reference is within a predetermined range, the presentation time stamp is utilized to back correct the system time clock that is reconstructed by an encoder, so that the audio data and video data may be synchronously played as much as possible. One other main spirit of the present invention is that, when the error of the program clock reference exceeds a predetermined range, the audio and video synchronization process is directly abandoned to reduce computing resources and efforts of the decoder.

In addition, the present invention is not limited to the application of the above audio video stream compliant with the MPEG standard. Given that an audio video stream includes multiple clock references and multiple audio and video data packets each corresponding to a presentation value, a decoder end reconstructs a clock value according to the clock reference, and an audio video synchronization step is performed according to the clock values and the presentation values, such audio video stream can be applied. Further, the presentation value corresponding to each of the data packets may be directly included in the audio video stream, or may be inferred from other presentation values in the audio video stream. In one embodiment, the clock reference may be a program clock reference, the presentation value may be a presentation time stamp, and the clock value may be a system time clock. Each of the audio and video data packets includes data of an audio frame and data of a video frame. The step of audio video synchronization includes one of: repeatedly playing at least one of the video data packets; repeatedly playing at least one of the audio data packets; not playing at least one of the video data packets; and not playing at least one of the audio packets.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A decoding method for audio video stream synchronization, the audio video stream comprising a plurality of clock references and a plurality of audio and video data packets, each of the data packets corresponding to a presentation value, the decoding method comprising:
reconstructing a clock value according to a first clock reference;
determining whether a difference between the clock value and a first presentation value of the plurality of presentation values is greater than a first range;
when the difference between the clock value and the first presentation value is greater than the first range, changing the clock value to a second presentation value of the plurality of presentation values;
performing at least one audio video synchronization step according to the clock value set based on the second presentation value;
determining whether a difference between a second clock reference and a third presentation value of the plurality of presentation values is smaller than the first range; and
when the difference between the second clock reference and the third presentation value is smaller than the first range, reconstructing the clock value according to the second clock reference;
wherein, in the audio video stream, the second clock reference is subsequent to the first clock reference.

2. The decoding method according to claim 1, wherein one of the second presentation value and the third presentation value corresponds to one of the video data packets, and the other corresponds to one of the audio data packets.

3. The decoding method according to claim 1, further comprising:
when the difference between the second clock reference and the third presentation value is greater than the first range, and a difference between the third presentation value and a fourth presentation value of the plurality of presentation values is greater than a second range, stopping again performing the at least one audio video synchronization step;
wherein, the one of the third presentation value and the fourth presentation value corresponds to one of the video data packets, and the other corresponds to one of the audio data packets.

4. The decoding method according to claim 3, further comprising:
when the difference between the second clock reference and the third presentation value is greater than the first range and the difference between the third presentation value and the fourth presentation value is smaller than the second range, again performing the at least one audio video synchronization step.

5. The decoding method according to claim 3, wherein the second range is greater than or equal to the first range.

6. The decoding method according to claim 3, wherein respective positive and negative boundaries of the first range and the second range are asymmetrical, the positive boundary of the second range is greater than the positive boundary of the first range, and the negative boundary of the second range is smaller than the negative boundary of the second range.

7. The decoding method according to claim 1, wherein when the difference between the clock value and the first presentation value is greater than the first range, the method further comprising determining whether the difference between the clock value and the first presentation value is greater than the first range for a period that exceeds a time limit, and changing the clock value to the second presentation value when the difference exceeds the time limit.

8. The decoding method according to claim 1, wherein the second presentation value equals the first presentation value.

9. The decoding method according to claim 1, wherein the audio and video data packets respectively comprise data of one audio frame and data of one video frame.

10. The decoding method according to claim 1, wherein the at least one audio video synchronization step comprises:
repeatedly playing at least one of the video data packets;
repeatedly playing at least one of the audio data packets;
not playing at least one of the video data packets; and
not playing at least one of the audio data packets.

11. A decoder for audio video stream synchronization, the audio video stream comprising a plurality of clock references and a plurality of audio and video data packets, each of the data packets corresponding to a presentation value, the decoder comprising:
a stream parsing module, configured to reconstruct a clock value according to a first clock reference;
a management module, configured to determine whether a difference between the clock value and a first presentation value of the plurality of presentation values is greater than a first range, and to change the clock value to a second presentation value of the plurality of presentation values when the difference between the clock value and the presentation value is greater than the first range; and
an audio video synchronization module, configured to perform at least one audio video synchronization step according to the clock value set based on the second presentation value,
wherein after the at least one audio video synchronization step is performed, the management module further determines whether a difference between a second clock reference and a third presentation value of the plurality of presentation values is smaller than the first range; when the difference between the second clock reference and the third presentation value is smaller than the first range, the management module further prompts the stream parsing module to reconstruct the clock value according to the second clock reference; in the audio video stream, the second clock reference is subsequent to the first clock reference.

12. The decoder according to claim 11, wherein one of the second presentation value and the third presentation value corresponds to one of the video data packets, and the other corresponds to one of the audio data packets.

13. The decoder according to claim 11, wherein when the difference between the second clock reference and the third presentation value is greater than the first range, and a difference between the third presentation value and a fourth presentation value of the plurality of presentation values is greater than a second range, the management module further prompts the audio video synchronization module to stop again performing the at least one audio video synchronization step; the one of the third presentation value and the fourth presentation value corresponds to one of the video data packets, and the other corresponds to one of the audio data packets.

14. The decoder according to claim 13, wherein when the difference between the second clock reference and the third presentation value is greater than the first range and the difference between the third presentation value and the fourth presentation value is smaller than the second range, the management module further prompts the audio video synchronization module to again perform the at least one audio video synchronization step.

15. The decoder according to claim 13, wherein the second range is greater than or equal to the first range.

16. The decoder according to claim 13, wherein respective positive and negative boundaries of the first range and the second range are asymmetrical, the positive boundary of the second range is greater than the positive boundary of the first range, and the negative boundary of the second range is smaller than the negative boundary of the second range.

17. The decoder according to claim 11, wherein when the management module determines that the difference between the clock value and the first presentation value is greater than the first range, the management module further determines whether the difference between the clock value and the first presentation value is greater than the first range for a period that exceeds a time limit, and changes the clock value to the second presentation value when the difference exceeds the time limit.

18. The decoder according to claim 11, wherein the second presentation value equals the first presentation value.

* * * * *